United States Patent
Yu

(10) Patent No.: US 9,272,449 B2
(45) Date of Patent: Mar. 1, 2016

(54) METHOD FOR MAKING LENS ARRAY

(75) Inventor: Tai-Cherng Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 808 days.

(21) Appl. No.: 13/545,928

(22) Filed: Jul. 10, 2012

(65) Prior Publication Data

US 2012/0273981 A1 Nov. 1, 2012

Related U.S. Application Data

(62) Division of application No. 12/555,880, filed on Sep. 9, 2009, now abandoned.

(30) Foreign Application Priority Data

Apr. 27, 2009 (CN) .................. 2009 1 0301879

(51) Int. Cl.
| | |
|---|---|
| *B29D 11/00* | (2006.01) |
| *B29C 43/02* | (2006.01) |
| *B29C 43/58* | (2006.01) |
| *G02B 3/00* | (2006.01) |
| *B29C 33/00* | (2006.01) |
| *B29C 33/30* | (2006.01) |
| *B29C 43/34* | (2006.01) |
| *B29L 11/00* | (2006.01) |

(52) U.S. Cl.
CPC ............. *B29C 43/021* (2013.01); *B29C 43/58* (2013.01); *B29D 11/00278* (2013.01); *G02B 3/0031* (2013.01); *G02B 3/0056* (2013.01); *B29C 33/00* (2013.01); *B29C 33/30* (2013.01); *B29C 33/303* (2013.01); *B29C 2043/3488* (2013.01); *B29C 2043/5833* (2013.01); *B29L 2011/0016* (2013.01)

(58) Field of Classification Search
IPC ......... B29D 11/00278,11/00298; B29C 43/021, B29C 43/58, 33/00, 33/30, 33/303, 2043/3488, B29C 2043/5833; G02B 3/0031, 3/0056
See application file for complete search history.

(56) References Cited

U.S. PATENT DOCUMENTS

| | | | |
|---|---|---|---|
| 7,094,304 B2 | 8/2006 | Nystrom et al. | |
| 2005/0093186 A1* | 5/2005 | Nystrom et al. | 264/1.36 |
| 2007/0102844 A1 | 5/2007 | Simon et al. | |
| 2007/0141191 A1 | 6/2007 | Kruijt-Stegeman et al. | |

FOREIGN PATENT DOCUMENTS

| | | |
|---|---|---|
| CN | 1885067 A | 12/2006 |
| JP | 200049447 A | 2/2000 |
| TW | I266686 | 11/2006 |
| TW | 200801794 A | 1/2008 |
| TW | 200906739 A | 2/2009 |

* cited by examiner

*Primary Examiner* — Mathieu Vargot
(74) *Attorney, Agent, or Firm* — Novak Druce Connolly Bove + Quigg LLP

(57) ABSTRACT

An exemplary method for making a lens array requires an imprinting mold and a substrate. A blob of molding material is applied on each molding section of the substrate. First alignment marks, and second alignment mark of the imprinting mold aligned with third and fourth alignment marks on each one of the imprinting regions, respectively. The imprinting mold is pressed on the molding material on the imprinting region. The pressed portions of the imprinting region are solidified to obtain lenses in the imprinting region. The imprinting mold is pressed on another one of the imprinting region, and the imprinting mold is removed. This process is repeated for each other imprinting region. Thus, a large-scale lens array is obtained.

16 Claims, 9 Drawing Sheets

METHOD FOR MAKING LENS ARRAY

CROSS-REFERENCE TO RELATED APPLICATION

This application is a divisional application of and claims the benefit of U.S. patent application Ser. No. 12/555,880 filed Sep. 9, 2009, now abandoned, entitled "IMPRINTING MOLD AND METHOD FOR MAKING LENS ARRAY", the entire contents of which are incorporated herein by reference.

BACKGROUND

1. Technical Field

The present disclosure relates to an imprinting mold that includes alignment marks, and to a method for making a lens array using such kind of imprinting mold.

2. Description of Related Art

Imprinting technology is a simple process with low cost, high throughput and high resolution. Imprinting technology is widely used for making a lens array in a wafer lens package (WLP) process.

In an imprinting process involving a large substrate, a large size imprinting mold is usually employed to produce a lens array on the substrate. However, the large size imprinting mold may be very expensive to make due to the need for high precision. Furthermore, it may be unduly time-consuming to manufacture the large size imprinting mold.

Therefore, an imprinting mold and a method for making a large-scale lens array which can overcome the above mentioned problems are desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Various embodiments will now be described in detail below with reference to the drawings.

Figure 1:
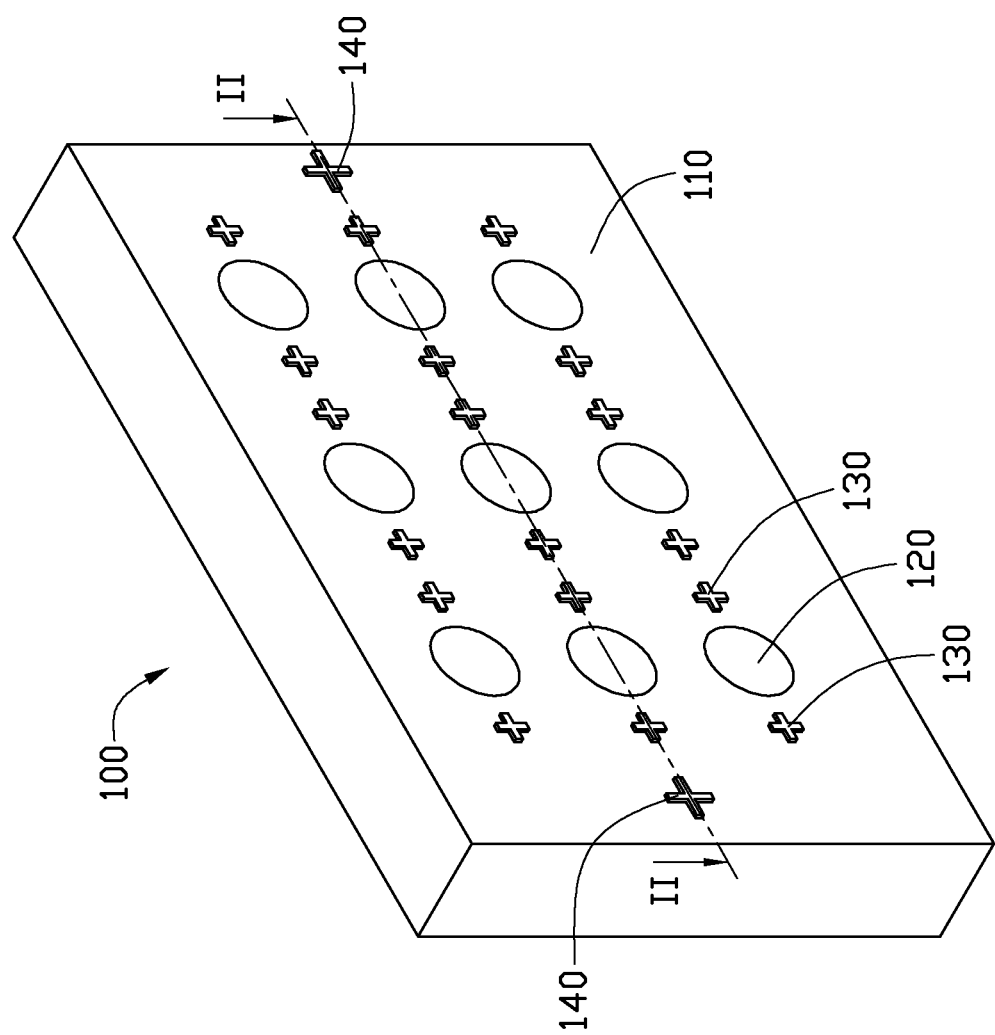
FIG. 1 is an isometric view of an imprinting mold including a plurality of first alignment marks and a plurality of second alignment marks according to an exemplary embodiment of the present disclosure.
Figure 2:
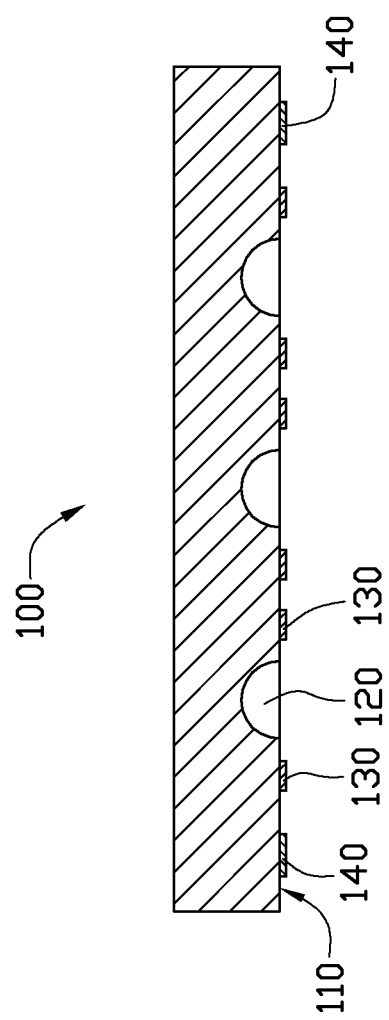
FIG. 2 is a cross-sectional view of the imprinting mold of FIG. 1, taken along line II-II thereof.
Figure 9:
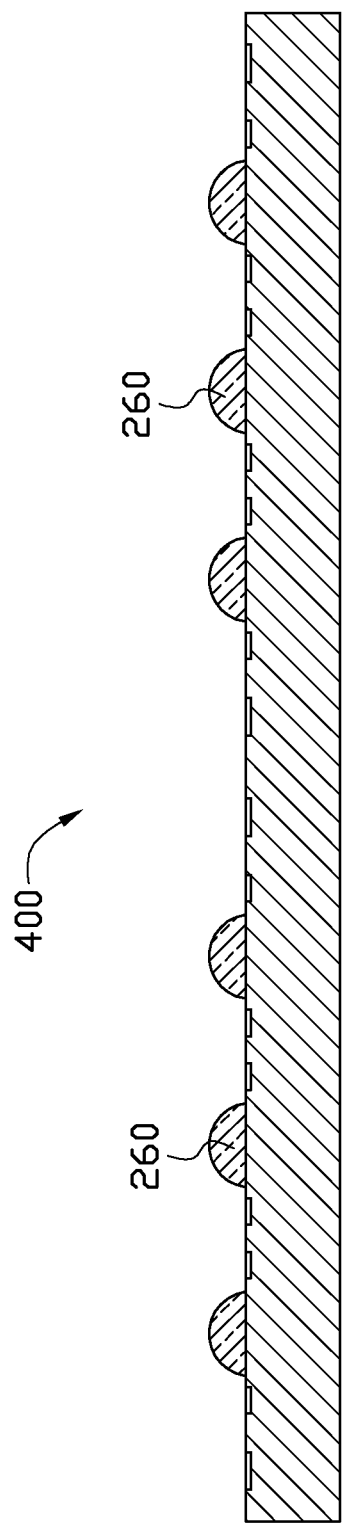
FIG. 9 is similar to FIG. 8, but with the imprinting mold having been removed, showing a lens array thus formed on the substrate.

Referring to FIG. 9, an exemplary method for making a lens array 400 is described in detail as follows:

Referring to FIGS. 1 and 2, an imprinting mold 100 is provided. The imprinting mold 100 includes a molding surface 110. A plurality of microstructures 120 are defined in the molding surface 110. The microstructures 120 are configured for molding the lens array 400. In the present embodiment, the microstructures 120 are recesses defined in the molding surface 110. In alternative embodiments, the microstructures 120 can be protrusions protruding from the molding surface 110. In the present embodiment, a surface of each microstructure 120 is aspheric. In alternative embodiments, the surface of each microstructure 120 can be spherical.

A plurality of first alignment marks 130 are formed on the molding surface 110. In the present embodiment, the first alignment marks 130 are protrusions protruding from the molding surface 110. In alternative embodiments, the first alignment marks 130 can be recesses defined in the molding surface 110. Two first alignment marks 130 are adjacent to each microstructure 120. Each of the first alignment marks 130 can be, for example, cross-shaped, T-shaped, I-shaped, F-shaped or E-shaped. In the present embodiment, each of the first alignment marks 130 is cross-shaped. In the present embodiment, two first alignment marks 130 are arranged symmetrically opposite each other across the center of the microstructure 120, and are spaced from the microstructure 120. The number and the arrangement of the first alignment marks 130 can be varied according to the requirements of practical applications.

Two second alignment marks 140 are formed at two opposite peripheries of the molding surface 110. In the present embodiment, the second alignment marks 140 are protrusions protruding from the molding surface 110. In alternative embodiments, the second alignment marks 140 can be recesses defined in the molding surface 110. Each of the second alignment marks 140 can be, for example, cross-shaped, T-shaped, I-shaped, F-shaped or E-shaped. In the present embodiment, each of the second alignment marks 140 is cross-shaped. In the present embodiment, the two second alignment marks 140 are arranged along an imaginary horizontal line, at two opposite ends of the molding surface 110. The number and the arrangement of the second alignment marks 140 can be varied according to the requirements of practical applications. In the present embodiment, each of the second alignment marks 140 has a larger size than that of each of the first alignment marks 130.

Figure 3:
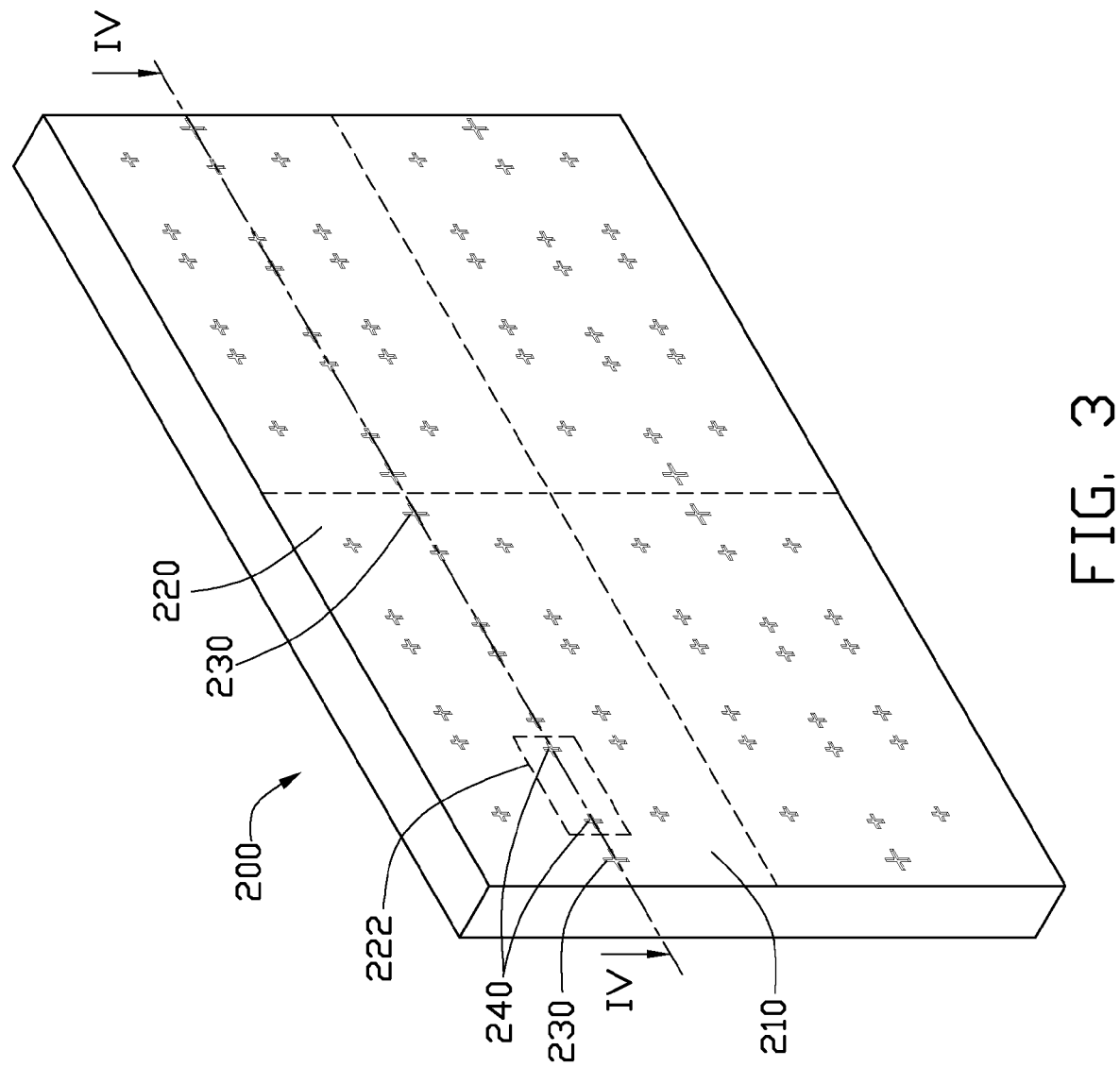
FIG. 3 is an isometric view of a substrate including a plurality of third alignment marks and a plurality of fourth alignment marks according to an exemplary embodiment of the present disclosure.
Figure 4:
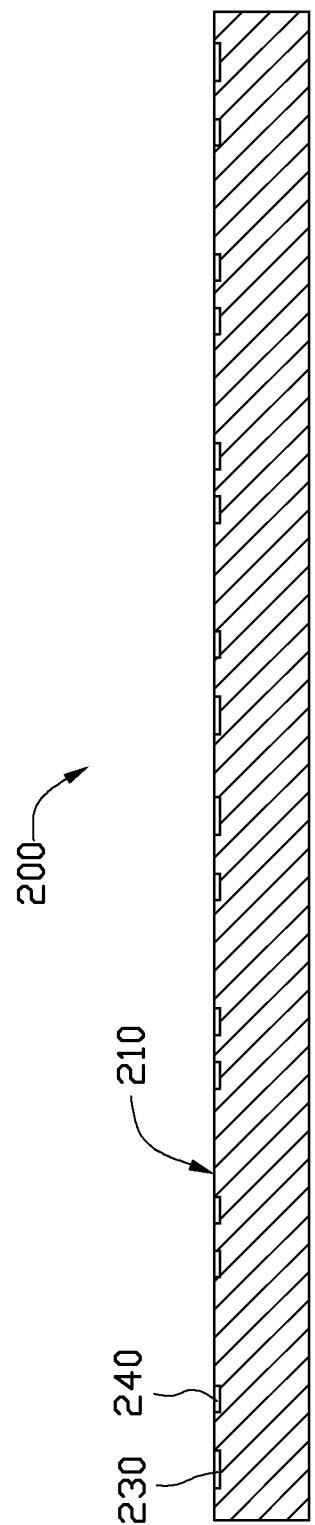
FIG. 4 is a cross-sectional view of the substrate of FIG. 3, taken along line IV-IV thereof.

Referring to FIGS. 3 and 4, a substrate 200 is provided. The substrate 200 includes a surface 210. The surface 210 is divided into four imprinting regions 220 (demarcated by broken lines in FIG. 3). The number of imprinting regions 220 is not limited to four. In alternative embodiments, the number of imprinting regions 220 can be less than four or more than four.

Two third alignment marks 230 are formed at two opposite peripheries of each imprinting region 220. The third alignment marks 230 of each imprinting region 220 correspond to the second alignment marks 140 of the imprinting mold 100. In the present embodiment, the third alignment marks 230 are recesses defined in the surface 210. In the present embodiment, the third alignment marks 230 have the same shape as the second alignment marks 140; that is, the third alignment marks 230 are cross-shaped. The number and the arrangement of the third alignment marks 230 can be varied according to the requirements of practical applications.

Each of the imprinting regions 220 is divided into a plurality of molding sections 222 (one of which is demarcated by broken lines in FIG. 3). Two fourth alignment marks 240 are formed on each of the molding sections 222. The two fourth alignment marks 240 of each molding section 222 correspond to the two first alignment marks 130 adjacent to each one of the microstructures 120 of the imprinting mold 100. In the present embodiment, the fourth alignment marks 240 are recesses defined in the surface 210. In the present embodiment, the fourth alignment marks 240 have the same shape as the first alignment marks 130; that is, the fourth alignment marks 240 are cross-shaped. The number and the arrangement of the fourth alignment marks 240 can be varied according to the requirements of practical applications. In the present embodiment, each of the third alignment marks 230 has a larger size than that of each of the fourth alignment marks 240.

In one embodiment, the first alignment marks 130, the second alignment marks 140, the third alignment marks 230, and the fourth alignment marks 240 are all formed by a photolithographic process.

Figure 5:
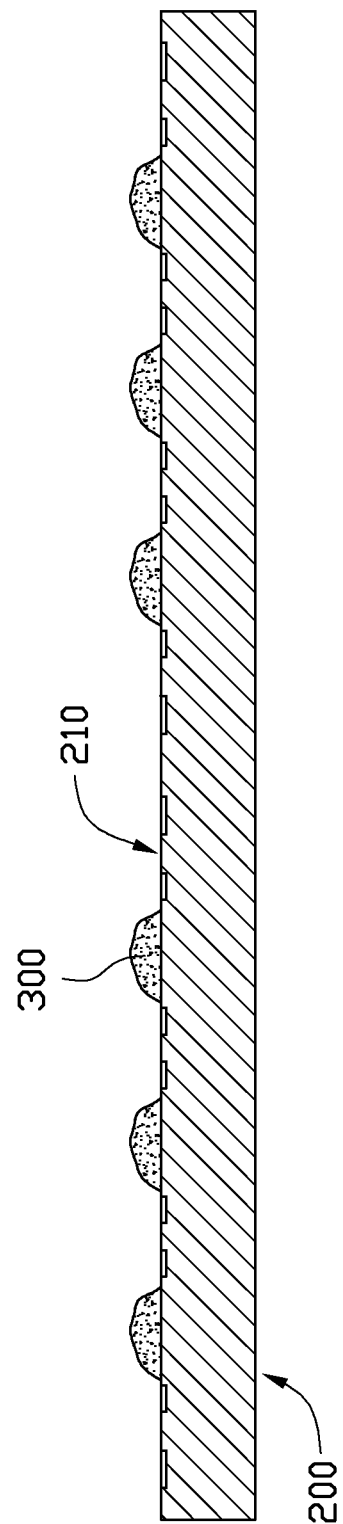
FIG. 5 is similar to FIG. 4, but showing the substrate with a blob of molding material applied to each of molding sections thereof.

Referring to FIG. 5, a blob of molding material 300 is applied to each of the molding sections 222. The molding material 300 can be, for example, epoxy resin, acrylate-based resin, polyurethane, or polymerized siloxane.

Figure 6:
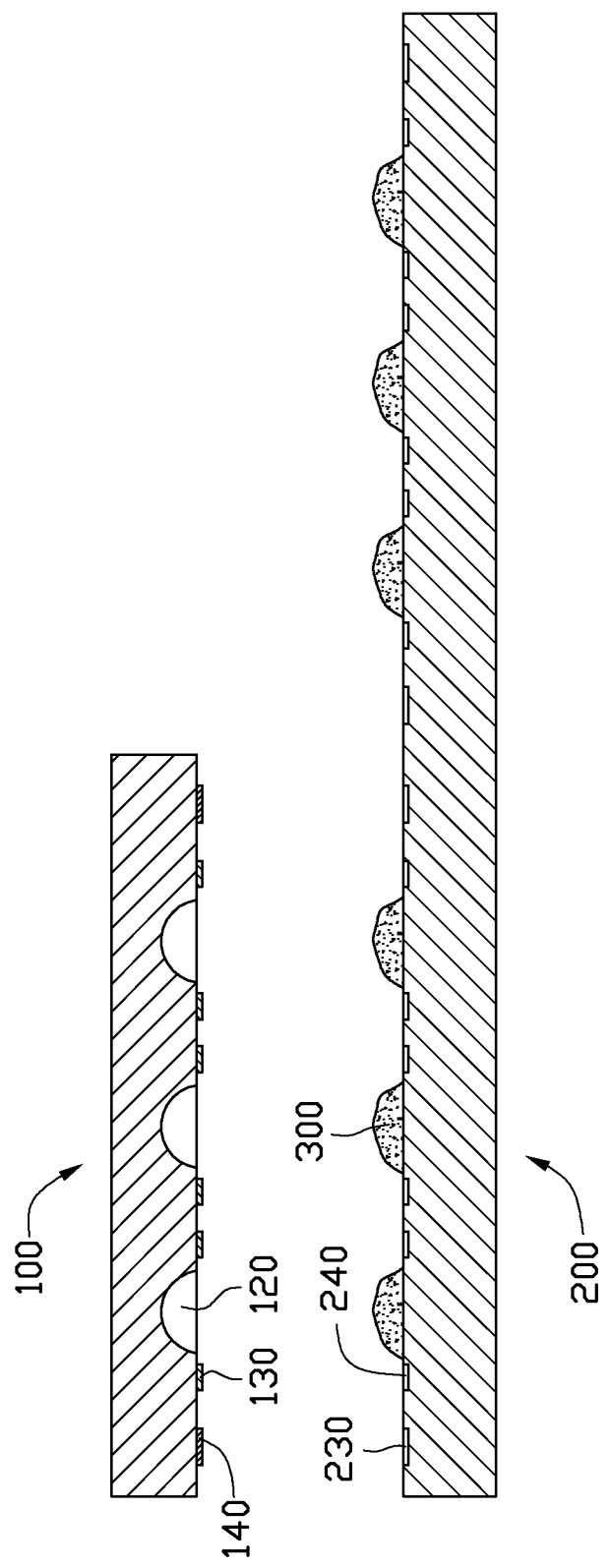
FIG. 6 shows the imprinting mold of FIG. 2 and the substrate of FIG. 5, wherein the first alignment marks and the second alignment marks of the imprinting mold are aligned with the fourth alignment marks and the third alignment marks of one of imprinting regions of the substrate, respectively.

Referring to FIG. 6, the first alignment marks 130 and the second alignment marks 140 of the imprinting mold 100 are aligned with the fourth alignment marks 240 and the third alignment marks 230 of one of the imprinting regions 220, respectively.

Figure 7:
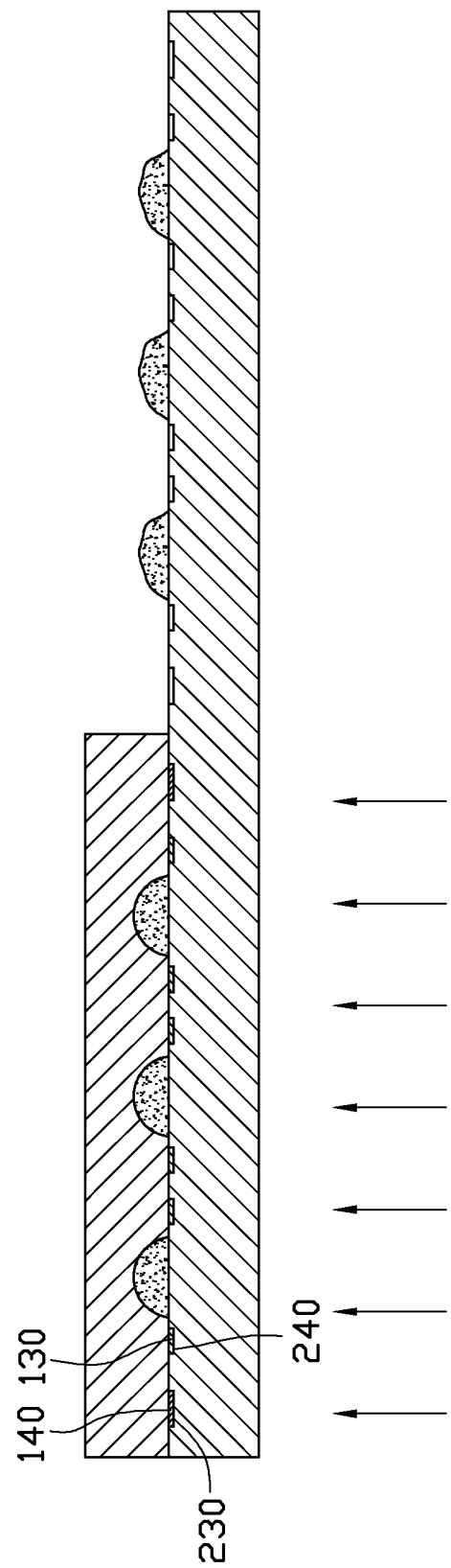
FIG. 7 is similar to FIG. 6, but showing the imprinting mold pressed on the molding material on the imprinting region, and the pressed portions of the molding material being solidified with ultraviolet (UV) light.

Referring to FIG. 7, the imprinting mold 100 is pressed onto the molding material 300 on the imprinting region 220, and the pressed portions of the molding material 300 are then solidified with ultraviolet (UV) light.

Figure 8:
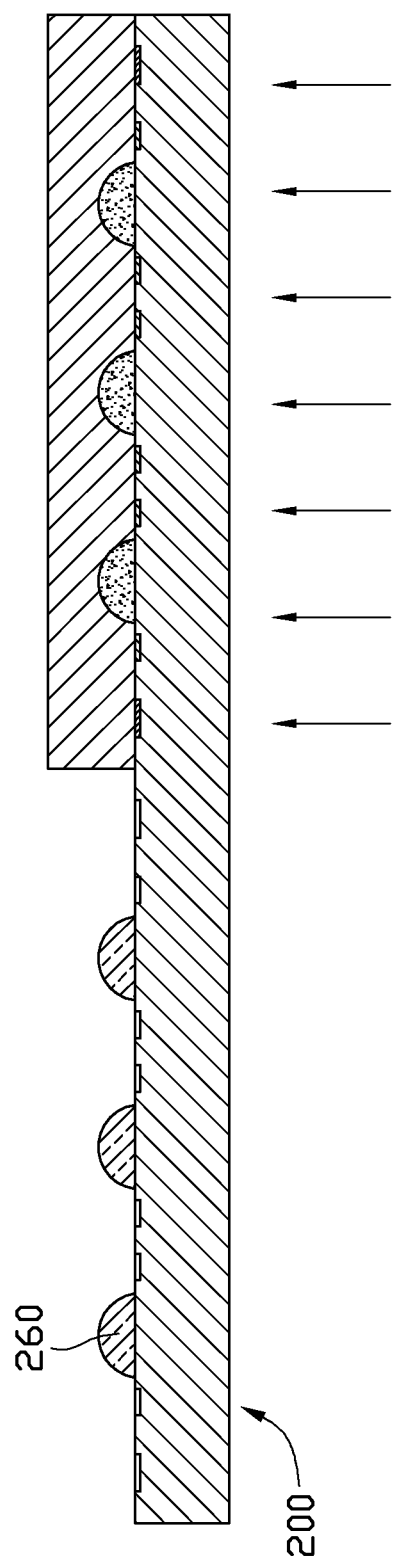
FIG. 8 is similar to FIG. 7, but showing the imprinting mold pressed on molding material on another one of the imprinting regions of the substrate, and the pressed portions of the molding material being solidified with UV light.

Referring to FIG. 8, after the pressed portions of the molding material 300 are solidified, the imprinting mold 100 is removed, thereby exposing a plurality of lenses 260 formed on the imprinting region 220. Subsequently, the imprinting mold 100 is pressed onto molding material 300 on another one of the imprinting regions 220. Then the pressed portions of the molding material 300 are solidified, and the imprinting mold 100 is removed. This process is repeated for each other imprinting region 220. Thus, a lens array 400 with a full plurality of all the lenses 260 is obtained, as shown in FIG. 9.

In the process of forming a plurality of lenses 260 on each imprinting region 220, the UV light should be controlled to avoid solidifying unpressed portions of molding material 300 on other imprinting regions 220 not yet processed. In other embodiments, the molding material 300 of a next imprinting region 220 to be processed can be applied only after the molding material 300 of the imprinting region 220 currently being processed has solidified.

The alignment of the second alignment marks 140 with the third alignment marks 230, allows the imprinting mold 100 to be precisely aligned with each of the imprinting regions 220. At the same time, because the first alignment marks 130 align with the fourth alignment marks 240, each molding section 222 of the imprinting region 220 can be aligned with each of the corresponding microstructures 120 of the imprinting mold 100. Therefore, the precision of the lens array 400 can be improved.

While certain embodiments have been described and exemplified above, various other embodiments from the foregoing disclosure will be apparent to those skilled in the art. The present disclosure is not limited to the particular embodiments described and exemplified, but is capable of considerable variation and modification without departure from the scope and spirit of the appended claims.

The invention claimed is:

1. A method for making a lens array, the method comprising:
   (1) providing an imprinting mold, the imprinting mold comprising a molding surface, the molding surface comprising a plurality of microstructures formed thereon, a plurality of first alignment marks adjacent to the corresponding microstructures, and a second alignment mark, wherein corresponding pairs of the plurality of first alignment marks are arranged symmetrically opposite each other across a center of each microstructure and spaced from the corresponding microstructure;
   (2) providing a substrate, the substrate comprising a surface, the surface including a plurality of imprinting regions, a third alignment mark formed in each of the imprinting regions, each of the imprinting regions including a plurality of molding sections, a plurality of fourth alignment marks being formed in each of the molding sections;
   (3) applying molding material on each of the molding sections of a selected one of the imprinting regions;
   (4) aligning the first alignment marks with the corresponding fourth alignment marks and aligning the second alignment mark with the third alignment mark of the selected one of the imprinting regions, the imprinting mold being able to align with each of the imprinting regions, and each molding section of the imprinting region being able to align with each of the corresponding microstructures of the imprinting mold;
   (5) pressing the imprinting mold on the molding material applied on the imprinting region;
   (6) solidifying the pressed portions of molding material on the imprinting region to obtain a plurality of lenses on the imprinting region; and
   (7) repeating steps (3) through (6) so as to obtain an array of the lenses formed on each of the imprinting regions.

2. The method of claim 1, wherein the molding material is selected from the group consisting of epoxy resin, acrylate-based resin, polyurethane, and polymerized siloxane.

3. The method of claim 1, wherein the pressed portions are solidified by ultraviolet (UV) light irradiation.

4. The method of claim 1, wherein the third alignment mark is a protrusion protruding from the surface of the substrate.

5. The method of claim 1, wherein the third alignment mark is a recess defined in the surface of the substrate.

6. The method of claim 1, wherein the fourth alignment marks are protrusions protruding from the surface of the substrate.

7. The method of claim 1, wherein the fourth alignment marks are recesses defined in the surface of the substrate.

8. A method for making a lens array, the method comprising:
   (1) providing an imprinting mold, the imprinting mold comprising a molding surface, the molding surface comprising a plurality of microstructures defined thereon, a plurality of first alignment marks adjacent to the corresponding microstructures, and two second alignment marks, the two second alignment marks being formed at two peripheries of the molding surface and arranged along an imaginary horizontal line, wherein two first alignment marks are arranged symmetrically opposite each other across a center of each microstructure and spaced from the microstructure, each pair of the first alignment marks are arranged symmetrically opposite each other across a center of each microstructure and spaced from the corresponding microstructure;

(2) providing a substrate, the substrate comprising a surface, the surface including a plurality of imprinting regions, two third alignment marks being formed in each of the imprinting regions, the two third alignment marks of each imprinting region correspond to the two second alignment marks of the imprinting mold, each of the imprinting regions including a plurality of molding sections, a plurality of fourth alignment marks being formed in each of the molding sections, a shape of each imprinting regions being substantially same as that of the molding surface;

(3) applying molding material on each of the molding sections of a selected one of the imprinting regions;

(4) aligning the first alignment marks with the corresponding fourth alignment marks and aligning the second alignment mark with the third alignment mark on the selected imprinting region, the imprinting mold being able to align with each of the imprinting regions, and each molding section of the imprinting region being able to align with each of the corresponding microstructures of the imprinting mold;

(5) pressing the imprinting mold on the molding material applied on the imprinting region;

(6) solidifying the pressed portions of molding material on the imprinting region to obtain a plurality of lenses on the imprinting region; and (7) repeating steps (3) through (6) so as to obtain an array of the lenses formed on each of the imprinting regions.

9. The method of claim 8, wherein the molding material is selected from the group consisting of epoxy resin, acrylate-based resin, polyurethane, and polymerized siloxane.

10. The method of claim 8, wherein the pressed portions are solidified by ultraviolet (UV) light irradiation.

11. The method of claim 8, wherein the two third alignment marks are protrusions protruding from the surface of the substrate.

12. The method of claim 8, wherein the two third alignment marks are recesses defined in the surface of the substrate.

13. The method of claim 8, wherein the plurality of fourth alignment marks are protrusions protruding from the surface of the substrate.

14. The method of claim 8, wherein the plurality of fourth alignment marks are recesses defined in the surface of the substrate.

15. The method of claim 1, wherein each of the two second alignment marks has a larger size than that of each of the two first alignment marks.

16. The method of claim 8, wherein each of the two second alignment marks has a larger size than that of each of the two first alignment marks.

* * * * *